Oct. 19, 1954     J. H. HAMMOND, JR., ET AL     2,692,145
TRAILER COUPLING DEVICE AND ANTIJACKKNIFE CONTROL THEREFOR
Filed Oct. 23, 1950

Inventor
JOHN HAYS HAMMOND, JR.
ALBERT D. TRENOR.

Attorney

Patented Oct. 19, 1954

2,692,145

UNITED STATES PATENT OFFICE 2,692,145

TRAILER COUPLING DEVICE AND ANTI-JACKKNIFE CONTROL THEREFOR

John Hays Hammond, Jr., and Albert D. Trenor, Gloucester, Mass.; said Trenor assignor to said Hammond, Jr.

Application October 23, 1950, Serial No. 191,695

5 Claims. (Cl. 280—432)

This invention relates to steering control of trailers and more particularly to means for preventing the jack-knifing of the vehicle.

An object of the invention is to provide means for applying a braking action to the coupling device of a trailer truck when there is a tendency for the trailer to jack-knife while allowing the free action of the coupling device when the relative motion between the trailer and tractor is in the opposite diretcion.

Figure 1:
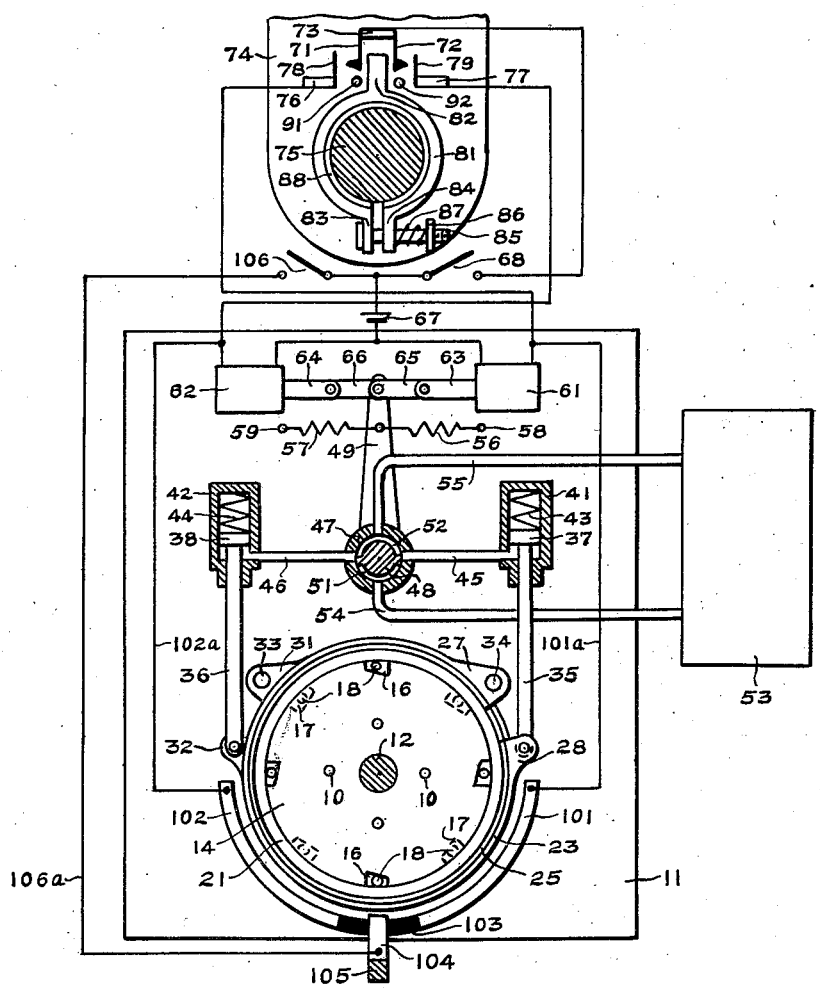
Figure 2:
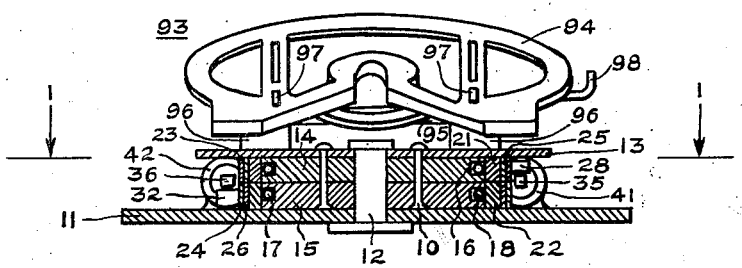

The nature of the invention as to its objects and advantages, the mode of its operation and the manner of its organization, may be better understood by referring to the following description, taken in connection with the accompanying drawing forming a part thereof, in which Fig. 1 is a schematic view, of a coupling and control mechanism constructed in accordance with the invention showing the coupling device in section taken in the line I—I of Fig. 2, and Fig. 2 is a side elevation partly in section of the coupling device shown in Fig. 1.

Like reference characters denote like parts in several figures of the drawing.

In the following description parts will be identified by specific names for convenience, but they are intended to be generic in their application to similar parts.

Referring to the accompanying drawings a base plate 11 is adapted to be mounted on the chassis of a tractor, not shown, in the usual manner. Secured to the base plate 11 is a pivot pin 12 on which is rotatably mounted a rotary disc 13. Mounted between the disc 13 and base plate 11 are two circular members 14 and 15 which are secured to the disc 13 by means of rivets 10 and therefore rotate with the disc 13 about the pin 12.

The member 14 is provided with wedge shaped slots 16 which slope toward the center in a clockwise direction and the member 15 is provided with wedge shaped slots 17 which slope toward the center in a counterclockwise direction. Located in the slots 16 and 17 are a plurality of steel balls 18. Rotatably mounted on the members 14 and 15 are two rings 21 and 22, the outside surfaces of which act as brake drums. Surrounding the rings 21 and 22 are two brake bands 23 and 24 which are provided with brake linings 25 and 26 which may be similar to those used in standard automotive equipment.

Secured to the brake band 23 are two ears 27 and 28 and secured to the brake band 24 are two ears 31 and 32. The ears 27 and 31 are rigidly secured to the base 11 by means of pins 33 and 34. Pivoted to the ears 28 and 32 are the ends of two piston rods 35 and 36 to the other ends of which are secured pistons 37 and 38 which reciprocate respectively in cylinders 41 and 42 mounted on the base plate 11. Behind the pistons 37 and 38 are located compression springs 43 and 44 which tend to advance the pistons and rods, thus relieving the pressure on the brake bands.

The forward ends of the cylinders 41 and 42 are connected by pipes 45 and 46 to a rotary valve which consists of a casing 47 and a rotary stem 48 which is provided with grooves 51 and 52. The valve 47 is also connected to a source of hydraulic fluid under pressure 53 by a supply pipe 54 and a return pipe 55. The valve stem 48 is secured to an arm 49 which is normally held in a central position by means of balanced springs 56 and 57, the distal ends of which are anchored to two pins 58 and 59 mounted on the base plate 11.

Mounted on the base plate 11 are two solenoids 61 and 62 the cores 63 and 64 of which are connected by links 65 and 66 to the end of the valve arm 49. One side of the windings of each solenoid 61 and 62 is connected thru a battery 67 and switch 68 to two flexible contacts 71 and 72 which are mounted on an insulating base 73 secured to a bracket 74 in which the steering column 75 of the tractor is supported. Mounted on two blocks of insulation 76 and 77 are two fixed contacts 78 and 79 which at suitable times are engaged by the flexible contacts 71 and 72. The fixed contacts 78 and 79 are connected respectively to the other sides of the windings of the solenoids 61 and 62.

Rotatably mounted on the steering column 75 is a split member 81 provided at one end with an arm 82 and at the split end with two lugs 83 and 84. Passing thru the lugs 83 and 84 is a bolt 85 provided with a nut 86 between which and the lug 84 is a compression spring 87. Secured to the inner surface of the split member 81 is a band of friction material 88 which engages the surface of the steering column 75. Mounted on the base plate 11 are two pins 91 and 92 which act as stops for the arm 82.

Mounted on the disc 13 is any standard type of coupling device 93. This for example may be of the type known as the Holland-Apgar Safety Fifth wheel made by the Holland Hitch Co. of Holland, Mich. In this type of coupling a lower bearing plate 94 is mounted on a rocking shaft 95 which rotates in bearings 96 secured to the disc 13. The lower bearing plate 94 is provided with spring mounted keys 97 which lock the lower bearing plate 94 to the upper bearing plate of the trailer (not shown) in a well known manner. A lever 98 is provided for operating the keys 97.

Mounted on but insulated from the base plate 11 are two segmental contacts 101 and 102 which are electrically connected to one side of the windings of the solenoids 61 and 62 by leads 101a and 102a respectively. Mounted between the segmental contacts 101 and 102 is a segment of insulation 103. If desired the extent of spacing between the segments 101 and 102 may be varied by making these segments adjustable in any well known manner. Engaging the segment of insulation 103 is a contact arm 104 which is mounted on an insulated bracket 105 secured to the disc 13 in any suitable manner not shown. The contact arm 104 is electrically connected by a lead 106a thru a switch 106 to one side of the battery 67.

*Operation*

In the operation of the form of the invention shown in the accompanying figures the upper and lower bearing plates of the trailer and tractor are locked together in the usual manner and the keys 97 are moved into an operative position by means of the lever 98. In this way the upper and lower bearing plates rotate together about the pivot pin 12 as the trailer swings to the right and left of the tractor in normal driving. As long as the switch 68 is open the swinging is unhampered, as the brake bands 23 and 24 are free from the rings 21 and 22.

When going down a steep hill or on icy roads the driver of the truck closes the switch 68, which may be located in the cab of the tractor. If the truck should go out of control and start to jack-knife so that the tractor swings in a counter-clockwise direction or to the left with respect to the trailer, the driver would naturally turn the steering wheel to the right to straighten out the vehicle thus rotating the steering column in a clockwise direction. This motion causes the split member 81 to rotate in a clockwise direction, due to the friction of the band 88 on the steering column 75, thus moving the arm 82 to the right until it engages the stop 92. In its travel the arm 82 engages the flexible contact 72 and shifts it into engagement with the fixed contact 79, thus energizing the solenoid 62 which my means of its core 64 and link 66, moves the arm 49 to the left. This causes the valve stem 48 to be rotated a small amount in a counter-clockwise direction, thus connecting the groove 51 with the pipe 45 and allowing fluid under pressure to pass from the supply source 53 to the cylinder 41. This causes the piston 37 to retract and tighten the brake band 23, thus locking the ring 21 to the base plate 11.

If the jack-knife action continues there will be a tendency for the ring 21, which is now locked to the tractor chassis, to rotate in a counter-clockwise direction with respect to the circular member 14 which is locked to the trailer thru the coupling. As soon as this relative motion starts, however, the balls 18 will roll in the wedged shaped slots 16 so as to act as a clutch between the circular member 14 and the ring 21, thus preventing any further jack-knifing or slow down the jack-knifing tendency by means of the braking action of the brake band 23.

As soon as the vehicle recovers from the jack-knifing tendency and the tractor tends to turn in a clockwise direction under the action of the steering wheel the relative motion between the ring 21 and the circular member 14 is reversed and the balls 18 will roll in a clockwise direction, thus releasing the clutching action.

If the vehicle tends to jack-knife to the right a similar but reverse action will take place. The steering wheel being turned to the left will swing the arm 82 to the left, closing the contacts 71—78 and energizing the solenoid 61 to rotate the valve stem 48 in a clockwise direction and allow fluid to enter the cylinder 42 thus tightening the brake band 24 which will lock the ring 22 to the plate 11.

Then any more tendency to jack-knife to the right will produce a relative motion in a clockwise direction between the ring 22 and the circular member 15 causing the balls 18 to roll in the grooves 17 so as to clutch the ring 22 to the circular member 15 and thus prevent any further jack-knifing. As the vehicle returns to a straight ahead position, the relative motion between the ring 22 and the member 15 is reversed and the clutching action ceases.

If it is desired to have the degree of angular motion between the tractor and trailer control the braking action the switch 68 is opened and the switch 106 closed. If, under these conditions, the tractor should swing to the left an amount sufficient for the segmental contact 102 to move into contact with the arm 104 a circuit would be closed from the battery 67 thru the solenoid 62 which, as previously described, would apply the brake band 23 to the ring 21 thus preventing any further relative motion to the left of the tractor with respect to the trailer. As soon as the tractor swung back to the right the segment 102 would move out of engagement with the arm 104 thus deenergizing the solenoid 62 and releasing the brake band 23.

If the trailer should swing to the right the opposite action would take place and the solenoid 61 would be energized to apply the brake band 24 to the ring 22 to prevent further swinging to the right.

It is thus seen that by providing two concentric over-riding oppositely acting clutches between the coupling gear and the tractor chassis and by providing braking means to be applied to the outside members of these clutches, it is possible to lock the tractor and trailer together so as to prevent or greatly minimize jack-knifing action. It is also seen that when the tractor and trailer tend to return to a normal driving condition the over-riding clutches cease to act and allow a free motion between tractor and trailer.

By the use of this invention it is seen that normal driving will be unhampered, but as soon as the trailer tries to take control away from the tractor the over-riding clutches will come into action and prevent or minimize jack-knifing.

Although only one of the various forms in which this invention may be embodied have been shown herein, it is to be understood that the invention is not limited to any specific construction but may be embodied in various forms without departing from the spirit of the invention.

What is claimed is:

1. A device for coupling tractors and trailers, comprising a base member to be fixed to the tractor, a second member to be fixed to the trailer and rotatably secured to the base member to turn with respect thereto about a vertical axis, a pair of oppositely directed clutches coupling said base member to said second member, each clutch being selectively engageable to lock said second member against rotational movement in one direction and to permit free rotational movement in the reverse direction, and means responsive to rotational movement of said second member from in line position beyond a given limit to engage the clutch which is directed to prevent further movement in the same direction whereby the movement of the trailer away from in line position with respect to the tractor is restricted.

2. A device for coupling tractors and trailers, comprising a base member to be fixed to the tractor, a second member to be fixed to the trailer and rotatably secured to the base member to turn with respect thereto about a vertical axis, a pair of oppositely directed clutches coupling said base member to said second member, each clutch being selectively engageable to lock said second member against rotational movement in one direction and to permit free rotational movement in the reverse direction, a steering column for said tractor and remote controlled means responsive to rotational movement of said steering column in a direction to return the tractor and trailer to in line position to engage the one of said clutches which is directed to prevent relative movement away from in line position, but to allow movement toward in line position.

3. A coupling device as claimed in claim 2 in which said clutches comprise rings, inner members having members engaging said rings when said inner members rotate in one direction, but releasable from said rings when said inner members rotate in the other direction, and brake bands selectively locking said rings against rotation in response to said remote controlled means.

4. A coupling device as claimed in claim 3 in which said remote controlled means comprises fluid pressure cylinders having pistons connected to actuate said brake bands, valve means connected to control the flow of fluid to said cylinders, and remote means to actuate said valve means.

5. A coupling device as claimed in claim 4 in which said last means comprises solenoids connected to control said valve means and energized in response to the turning of said steering column.

References Cited in the file of this patent

UNITED STATES PATENTS

| Number | Name | Date |
|---|---|---|
| 903,884 | Przygode | Nov. 17, 1908 |
| 1,238,075 | Adams | Aug. 28, 1917 |
| 2,343,984 | Lambert | Mar. 14, 1944 |
| 2,361,935 | French | Nov. 7, 1944 |